Sept. 1, 1931.  A. J. McGRATH  1,821,844
COURSE INDICATOR FOR AIRCRAFT
Filed July 17, 1929   2 Sheets-Sheet 2
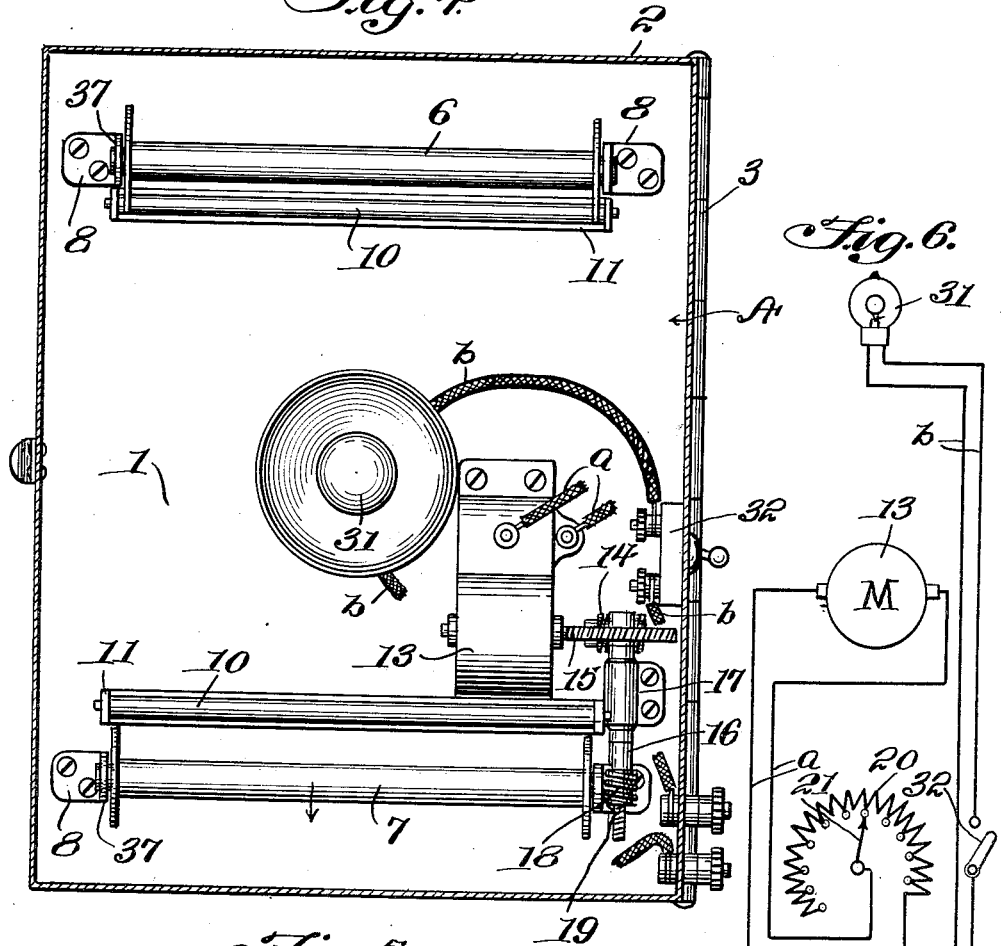
INVENTOR.
Arthur J. McGrath
BY
Victor J. Evans
ATTORNEY.

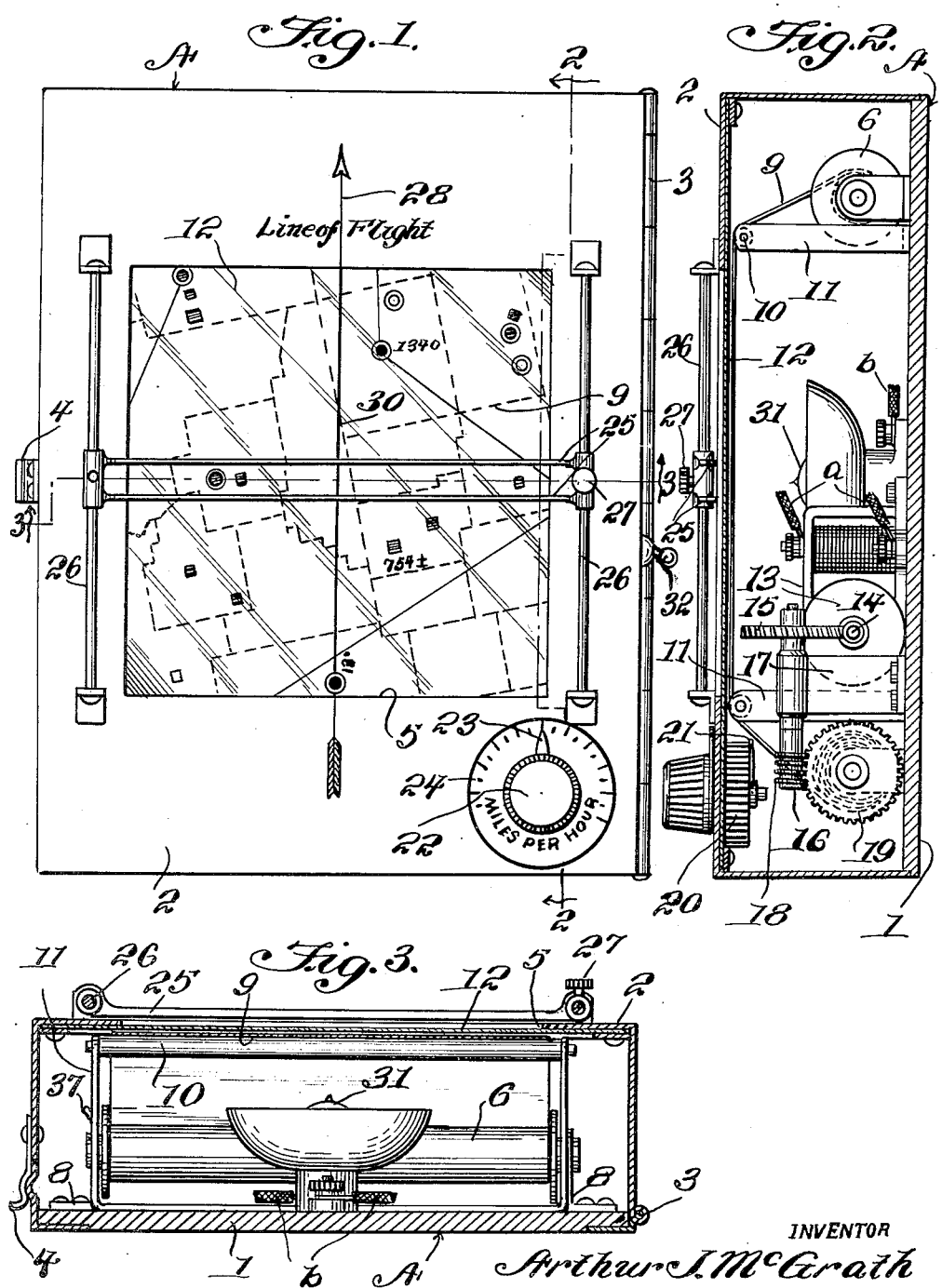

Patented Sept. 1, 1931

1,821,844

UNITED STATES PATENT OFFICE

ARTHUR J. McGRATH, OF WASHINGTON, DISTRICT OF COLUMBIA

COURSE INDICATOR FOR AIRCRAFT

Application filed July 17, 1929. Serial No. 379,052.

This invention relates to a course indicator for aircraft and the objects of the invention are:—

First—To provide a means for moving a map in a casing, with means for adjusting the speed of the movement of the map to the estimated ground speed of the aircraft, so that the territory of and adjacent to the line of flight (drawn through the center of the map between the point of departure and destination) will be shown at all times and with the smallest amount of effort on the part of the operator.

Second—To indicate the estimated position of the aircraft over the line of flight, by adjusting the position bar to intersect with the line of flight at the point of departure, the ground speed being estimated and registered on the dial, and the compass bearing set to correspond to the line of flight.

Third—To provide a means of checking force and direction of wind by flying compass course of line of flight for determined length of time and checking distance and direction from point of intersection at end of this time.

A means is also provided for illuminating the map so that it can be used at night.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a top plan view of the device.

Figure 2 is a section on line 2—2 of Figure 1.

Figure 3 is a section on line 3—3 of Figure 1.

Figure 4 is a horizontal section through the casing, with the parts therein in plan and with the map removed.

Figure 5 is a view partly in section, of the driven roller.

Figure 6 is a diagrammatic view of the circuits.

In these views, the letter A indicates a casing which is formed of the base part 1 and the cover part 2, said cover part being hingedly connected with the base part, as shown at 3, and having a latch 4 for holding it in closed position. The top part of the cover part is formed with a relatively large opening 5 therein. Rolls 6 and 7 have their pintles journaled in the brackets 8 located within the casing and a map sheet 9 has its ends fastened to these rolls. Small rolls 10 are carried by the uprights 11 located in the casing and these rolls 10 cause the map sheet to pass close to the inner face of a transparent member 12 which covers the opening 5.

A motor 13 is arranged in the casing and has a worm 14 on its shaft which meshes with a worm gear 15 on a shaft 16 journaled in a bearing member 17 in the casing and the other end of said shaft 16 has a worm 18 thereon which meshes with a worm gear 19, the hub of which is loosely mounted on one of the pintles of the roll 7, so that this roll, and therefore the map, will be actuated from the motor. The circuit of the motor is shown at $a$, the battery of which is shown at B, and a rheostat 20 is located in the circuit. The finger 21 of this rheostat is connected with a knob 22 located exteriorly of the casing, and said knob has a finger 23 thereon which co-operates with a dial 24 on the top of the casing for facilitating the adjustment of the speed of movement of the map in accordance with the speed of the craft. For instance, if the craft is traveling at a rate of 75 miles per hour, ground speed the rheostat would be set to cause the motor to move the map at a relative speed which would, of course, be in accordance with the scale on which the map is made.

A position bar 25 has its ends slidably arranged on the bars 26 supported from the top of the casing, with a set screw 27 for holding the position bar in adjusted position. This bar is preferably composed of two parts, with a transparent member between them, the transparent member having a center line thereon and said member may be graduated, if desired. The top of the casing has marked thereon at its center, the front and rear portions of an arrow 28 for indicating the line of flight and a line 30 is drawn through the longitudinal length of the map sheet, this line being in alignment with the lines of the arrow, as shown in Figure 1. Of course, the map travels in a direction opposite to the line of flight and as it is moved at a speed relative to the speed of the aeroplane, the aviator can tell by glancing at the map just what part of the country he is flying over, as the line on the position bar where it intersects the line 30, will indicate his position. If he should be blown or otherwise get to one side or the other of his proper line of flight, he can easily tell where he is by finding his position on the map and measuring this position from the line 30 on the map with a rule which is scaled the same as the map.

I also provide means for illuminating the map so that it can be read at night or on dark days, such means comprising a lamp and reflector 31 arranged in the casing, with a reflector acting to reflect the rays of light on to the map and the lamp is connected by the conductors *b* with the battery, a switch 32 being arranged in the circuit *a* and arranged exteriorly of the casing.

A spring clutch 33 connects the pintle of the driven roll 7 with the gear 19 so that the map can be adjusted when the motor is idle by turning one of the rolls without interference from the gearing and motor. Each roll 6 and 7 is removable from its pintles, as shown in Figure 5, as one end of each roll has a square socket 34 therein to receive a square part 35 of one of the pintles and the other pintle 36 is carried by a spring member 37 so that by pushing this spring member outwardly, the pintle 36 will be removed from the socket 38 in the roll. Then the roll can be removed from the pintles.

From the foregoing it will be seen that I have provided an inexpensive device for enabling an aviator to tell at all times just what part of the country he is flying over and which also enables him to get back on his course if he should, for any reason, get off the course.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A course indicator for aircraft comprising a casing having a window therein, a pair of rolls in the casing, a map sheet having its ends connected with the rolls, means for holding a portion of the sheet adjacent the window, a motor for rotating one of the rolls, means for adjusting the speed of the motor and an adjustable position bar extending over the window, said bar comprising a pair of spaced members and a strip of transparent material between them.

In testimony whereof I affix my signature.

ARTHUR J. McGRATH.